J. W. MONTAGUE AND VAN G. PATRICK.
GRAIN CONVEYER.
APPLICATION FILED JULY 19, 1920.
1,420,726.
Patented June 27, 1922.
3 SHEETS—SHEET 3.
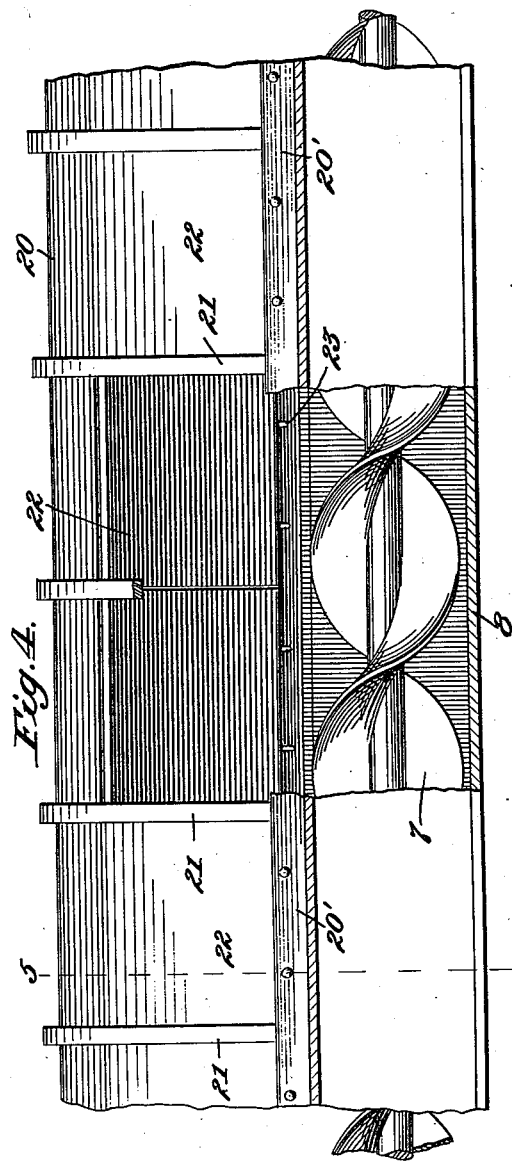
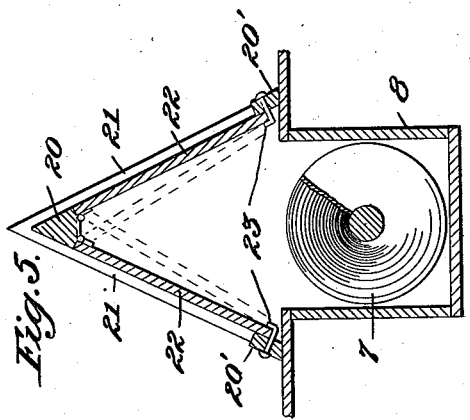
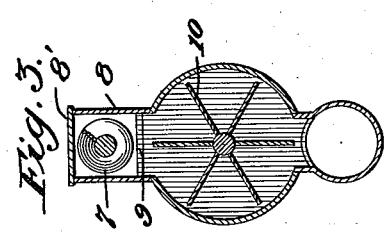
Inventors:
John W. Montague
and Van G. Patrick,

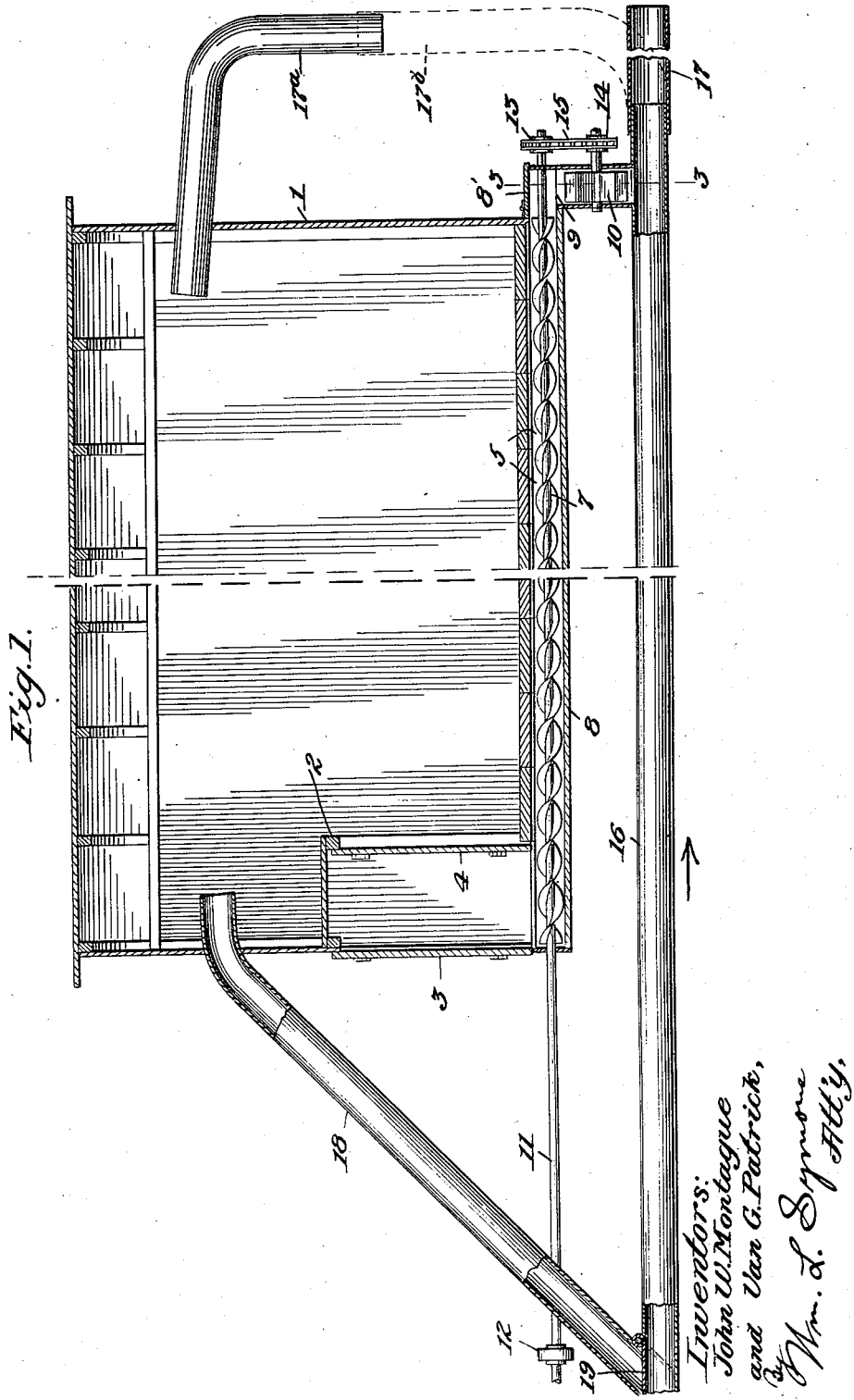

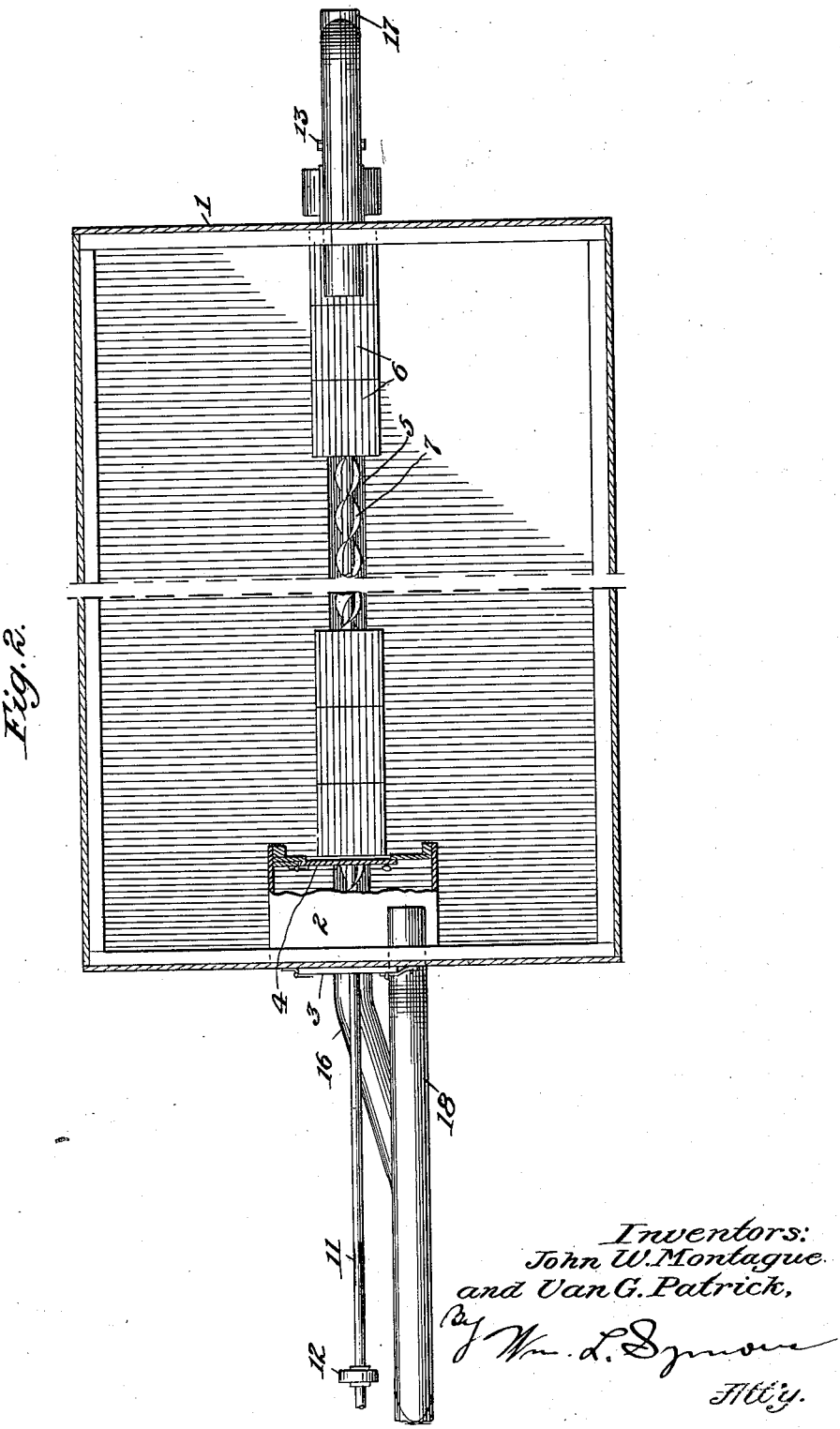

UNITED STATES PATENT OFFICE.

JOHN W. MONTAGUE, OF TRENTON, AND VAN G. PATRICK, OF POSTELLE, ARKANSAS, ASSIGNORS TO UNIVERSAL SEED LOADING COMPANY, OF HELENA, ARKANSAS, A CORPORATION OF ARKANSAS.

GRAIN CONVEYER.

1,420,726.   Specification of Letters Patent.   Patented June 27, 1922.

Application filed July 19, 1920. Serial No. 397,444.

*To all whom it may concern:*

Be it known that we, JOHN W. MONTAGUE and VAN G. PATRICK, citizens of the United States of America, residing at Trenton and Postelle, respectively, in the county of Phillips and State of Arkansas, have invented certain new and useful Improvements in Grain Conveyers, of which the following is a specification.

Our invention relates to improvements in apparatus for conveying seed, grain and similar material from a storehouse to cars or other means of transportation. It may also be used to dry wet seed and to reduce the heat which often develops in seed or grain when it is stored. The drying or cooling results from causing the seed to pass from the storehouse through the apparatus and back again into the same or another storehouse.

It is well known that in the harvesting of cotton seed it is often necessary to fill storehouses to their utmost capacity because means of transporting the seed to market are not immediately available. One of the objects of our invention, therefore, is the construction of a storehouse which may be completely filled and then emptied by economy of labor and without waste of cotton seed.

A further object of our invention is to overcome the well known difficulty in taking cotton seed out of a storehouse due to the fact that the seed "heats" and "packs" rendering handling difficult.

A further object of our invention is the construction of means by which cotton seed if it "heats" and becomes packed and moist may be taken out of a storehouse, passed through pipes in which air at considerable pressure is passing and be returned to the storehouse cooled and dried.

These and further objects are accomplished by our invention, one embodiment of which is shown in the accompanying drawings in which—

Figure 1 is a longitudinal vertical section of the storehouse, showing the conveyer apparatus partly in elevation;

Figure 2 is a plan view of a storehouse with the roof removed;

Figure 3 is a section on line 3—3 of Figure 2;

Figure 4 is a side view of a modified form of covering of the opening into the screw conveyer; and Figure 5 is a section on line 5—5 of Figure 4.

A storehouse 1 of any of the usual dimensions desired is built on piles or other foundation, not shown, in order that the outlet from the bottom of the storehouse will be approximately at a level with the top of the car or other receptacle into which the seed is to be conveyed from the storehouse. If the car be placed in a cut, the storehouse, of course, need not be elevated. It is, however, not necessary in carrying out our invention that the storehouse be elevated or that the car be placed lower than the storehouse, as the seed may be raised into the car by means referred to later.

In one end of the storehouse about midway between the sides thereof is placed a small booth or receptacle 2. Entrance to this booth is obtained by a door 3 swinging outward. In the rear of this booth and leading into the storehouse is another door 4 swinging into the booth.

Longitudinally of the house is an opening 5 which may be of any desired width but which usually will be from twelve to eighteen inches wide. This opening extends the entire length of the house and may be covered by panels 6 of any convenient width, except that the part within the booth need not be covered. Below the opening 5 from the storehouse is a screw conveyer 7 of the usual type, surrounded by a trough 8. This trough extends a short distance beyond the end of the house opposite the end in which the booth is placed and is closed by a removable covering 8'. At the end of the house opposite the booth is an opening 9 into a feed valve 10 which is of any usual construction, a six-bladed valve being here shown, to prevent the air from the pressure pipe from passing into the feed conveyer. Motion is imparted to the screw conveyer by a shaft 11 on which is a pulley 12 which is connected with any suitable source of power. Suitable motion is imparted to the feed valve by connecting a wheel 13, integral with the shaft of the screw conveyer, with a wheel 14, integral with the shaft of the feed valve, by a chain 15 or other suitable means.

Below the conveyer is placed a pipe 16 connected with a centrifugal fan, not shown, by which any desired air pressure in said pipe may be maintained. Into this pipe seed from the storehouse passes from the feed valve and is carried by gravity and air pressure to any means of conveying it to its destination, such as a railroad car. A pipe 17 may be joined to the pressure pipe to carry the seed to the car or other conveying means. The air pressure in this pipe may be high or low, depending on what it is intended to accomplish. The pressure required to return the seed to the storehouse from which it has been taken will usually be greater than to blow the seed into a car.

The storehouse is filled by means of a pipe 18 leading from the gin, not shown, which carries the seed directly into the top of the storehouse. When it is desired to fill the house, the valve 19 is placed in the position shown in dotted lines, allowing the current to carry the seed into the house as indicated. When it is desired to empty the storehouse, the valve is raised, allowing the free movement of the air from the fan to the seed as it comes from the feed valve.

While we have described an apparatus for conveying seed from a house to a means of transporting it, our apparatus may be used for conveying the seed from one house to another house when the seed in the first house has become heated or is injured by moisture. Experience has shown that the screw conveyer, feed valve, and pressure pipe will reduce the moisture and heat from a point which may injure the seed to a practically normal condition.

To empty the storehouse and return the seed to the same house, it is necessary to remove the pipe 17 leading to a car and to connect pipes 17$^a$ and 17$^b$ to the end of the pressure pipe. By means of these pipes the seed may be returned to the storehouse.

Instead of sectional coverings for the opening into the screw conveyer which lie flat over the opening, the opening may be covered in the manner shown in Figures 4 and 5. The cover in these figures extends from the end of the house to the booth and may be wide and high enough to enable a workman to enter it. In practice, it is found that a width at the base of three feet and a height of four feet are sufficient. A ridge pole or top member 20 is held in position by braces 21 arranged opposite each other at convenient distances on either side of the V-shaped tunnel. Between the braces on both sides of the tunnel are doors 22 which may be swung inwardly, as shown by dotted lines in Figure 5, and held open temporarily by any desired means. The doors close against bottom strips 20' and are secured closed by any desired means, such as a latch 23.

Our device has many advantages when used in conveying cotton seed. It is well known that cotton seed as it comes from the gin is covered with a short lint which makes it difficult to handle. It will not "run" readily like wheat, oats and similar grain, and conveyer means must therefore be constructed to prevent clogging or choking of the conveyer parts. The booth, sectional coverings for the opening into the screw conveyer or the tunnel covering for this opening, and the removable covering for the end of the conveyer trough, are important features of our invention.

The booth is used to start the process of emptying the storehouse when the house is so full that access to the sectional covers for the trough can not be obtained. Opening the door from the booth to the storehouse, to which booth entrance is provided by an outer door, permits the seed to be fed into the part of the conveyer inside the booth until the grain above the first section of the trough cover has been uncovered. The use of this improved means to start to empty the storehouse enables the house to be completely filled and then emptied without wasting the seed, and without the labor and expense of taking the seed out of the house in order to reach the first section of the trough cover.

We claim:

1. Apparatus for conveying material, comprising in combination, a storehouse, the bottom of said storehouse comprising sections, said sections being adapted to swing, a trough below said sections, said trough extending beyond the end of said storehouse, the part of said trough extending beyond the end of said storehouse having a removable cover therefor, a screw conveyer located in said trough, a feed valve connected with said trough and a pressure pipe connected with said feed valve.

2. Apparatus for conveying material, comprising in combination a storehouse, a booth in one end of said storehouse, said booth normally closed from the other part of said storehouse, said storehouse having an opening from the outside thereof into said booth, said booth having an opening from the inside thereof into said storehouse, said storehouse having an opening in the bottom thereof, means to close said opening except within said booth, a screw conveyer located beneath said opening, a feed valve connected with said screw conveyer, a pressure pipe connected with said feed valve, and means for imparting motion to said screw conveyer and said feed valve.

3. Apparatus for conveying material, comprising in combination a storehouse, a booth in one end of said storehouse, said booth normally closed from the other part of said storehouse, said storehouse having an opening from the outside thereof into said booth, said booth having an opening from the inside thereof into said storehouse, said storehouse having an opening in the bottom thereof, sectional means to close said opening except within said booth, a screw conveyer located beneath said opening, a feed valve connected with said screw conveyer, a pressure pipe connected with said feed valve, and means for imparting motion to said screw conveyer and said feed valve.

4. Apparatus for conveying material, comprising in combination a storehouse, a booth in one end of said storehouse, said booth normally closed from the other part of said storehouse, said storehouse having an opening from the outside thereof into said booth, said booth having an opening from the inside thereof into said storehouse, said storehouse having an opening in the bottom thereof, means to close said opening consisting of hinged sections arranged as a V-shaped tunnel over all of said opening except the part within the booth, a screw conveyer located beneath said opening, a feed valve at one end of said screw conveyer, a pressure pipe connected with said feed valve, and means for imparting motion to said screw conveyer and said feed valve.

5. An apparatus for conveying material, comprising in combination a storehouse, the bottom of said storehouse comprising sections, a booth in one end of said storehouse, means to enter said booth from the outside of said storehouse, communicating means between the inside of said booth and the inside of said storehouse and mechanical conveying means located in the bottom of said booth and below the sectional bottom of said storehouse.

6. An apparatus for conveying material, comprising in combination a storehouse, the bottom of said storehouse comprising sections, said sections consisting of doors arranged V-shaped and adapted to swing inwardly, a booth in one end of said storehouse, means to enter said booth from the outside of said storehouse, communicating means between the inside of said booth and the inside of said storehouse and mechanical conveying means located in the bottom of said booth and below the sectional bottom of said storehouse.

In testimony whereof we affix our signatures.

JOHN W. MONTAGUE.
VAN G. PATRICK.